United States Patent
Wu et al.

(10) Patent No.: US 11,968,695 B2
(45) Date of Patent: Apr. 23, 2024

(54) COMMUNICATION DEVICE, WIRELESS COMMUNICATION SYSTEM, AND RESOURCE SELECTING METHOD

(71) Applicant: FUJITSU LIMITED, Kawasaki (JP)

(72) Inventors: Jianming Wu, Kawasaki (JP); Hiroshi Aoki, Fujisawa (JP)

(73) Assignee: FUJITSU LIMITED, Kawasaki (JP)

( * ) Notice: Subject to any disclaimer, the term of this patent is extended or adjusted under 35 U.S.C. 154(b) by 435 days.

(21) Appl. No.: 17/245,088

(22) Filed: Apr. 30, 2021

(65) Prior Publication Data
US 2021/0258944 A1   Aug. 19, 2021

Related U.S. Application Data

(63) Continuation of application No. PCT/JP2018/041406, filed on Nov. 7, 2018.

(51) Int. Cl.
*H04W 72/51* (2023.01)
*H04W 72/02* (2009.01)
*H04W 72/0453* (2023.01)

(52) U.S. Cl.
CPC ........... *H04W 72/51* (2023.01); *H04W 72/02* (2013.01); *H04W 72/0453* (2013.01)

(58) Field of Classification Search
CPC .. H04W 72/51; H04W 72/02; H04W 72/0453
See application file for complete search history.

(56) References Cited

U.S. PATENT DOCUMENTS

| | | | |
|---|---|---|---|
| 2016/0219636 A1 | 7/2016 | Fujishiro et al. | |
| 2017/0105240 A1 | 4/2017 | Chen | |
| 2017/0299688 A1* | 10/2017 | Hata | G01S 1/68 |
| 2018/0234888 A1 | 8/2018 | Yasukawa et al. | |
| 2019/0208504 A1 | 7/2019 | Yasukawa et al. | |
| 2021/0352623 A1* | 11/2021 | Wang | H04W 72/0453 |

FOREIGN PATENT DOCUMENTS

| | | |
|---|---|---|
| CN | 105991207 A | 10/2016 |
| CN | 106471853 A | 3/2017 |
| JP | 2018-129803 A | 8/2018 |
| WO | 2017/026545 A1 | 2/2017 |
| WO | 2017/171909 A1 | 10/2017 |

(Continued)

OTHER PUBLICATIONS

First Notification of Office Action and Search report issued by the China National Intellectual Property Administration for corresponding Chinese Patent Application No. 201880099081.1, dated Jun. 27, 2023, with an English translation.

(Continued)

*Primary Examiner* — Chandrahas B Patel
(74) *Attorney, Agent, or Firm* — Myers Wolin, LLC

(57) ABSTRACT

A communication device includes a processor that selects a first resource such that the first resource that is used to transmit data by the communication device does not overlap with a second resource that is used to transmit data by another communication device located in vicinity of the communication device and a transmitter that transmits the data by using the first resource selected by the processor.

7 Claims, 8 Drawing Sheets

(56) References Cited

FOREIGN PATENT DOCUMENTS

| | | |
|---|---|---|
| WO | 2017/199447 A1 | 11/2017 |
| WO | 2018/030541 A1 | 2/2018 |

OTHER PUBLICATIONS

International Search Report and Written Opinion of the International Searching Authority issued by the Japan Patent Office for corresponding International Patent Application No. PCT/JP2018/041406, dated Jan. 15, 2019, with an English translation.
AT&T, "Resource allocation mechanism", Agenda Item: 7.2.4.1.4, 3GPP TSG-RAN WG1 Meeting #95, R1-1812872, Spokane, USA, Nov. 12-16, 2018.
OPPO, "Discussion on mode 2 resource allocation in NR-V2X", Agenda Item: 7.2.4.1.4, 3GPP TSG-RAN WG1 Meeting #95, R1-1812827, Spokane, USA, Nov. 12-16, 2018.
Fujitsu, "Orthogonal Resource Scheduling based Multicast NR-V2X Transmission", Agenda Item: 7.2.4.1.4, 3GPP TSG-RAN WG1 Meeting #94Bis, R1-1810591, Chengdu, China, Oct. 8-12, 2018.
3GPP TS 22.186 V16.0.0, "3rd Generation Partnership Project; Technical Specification Group Services and System Aspects; Enhancement of 3GPP support for V2X scenarios; Stage 1 (Release 16)", Sep. 2018.
3GPP TS 36.211 V15.2.0, "3rd Generation Partnership Project; Technical Specification Group Radio Access Network; Evolved Universal Terrestrial Radio Access (E-UTRA); Physical channels and modulation (Release 15)", Jun. 2018.
3GPP TS 36.212 V15.2.1, "3rd Generation Partnership Project; Technical Specification Group Radio Access Network; Evolved Universal Terrestrial Radio Access (E-UTRA); Multiplexing and channel coding (Release 15)", Jul. 2018.
3GPP TS 36.213 V15.2.0, "3rd Generation Partnership Project; Technical Specification Group Radio Access Network; Evolved Universal Terrestrial Radio Access (E-UTRA); Physical layer procedures (Release 15)", Jun. 2018.
3GPP TS 36.300 V15.2.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", Jun. 2018.
3GPP TS 36.321 V15.2.0, "3rd Generation Partnership Project; Technical Specification Group Radio Access Network; Evolved Universal Terrestrial Radio Access (E-UTRA); Medium Access Control (MAC) protocol specification (Release 15)", Jul. 2018.
3GPP TS 36.322 V15.1.0, "3rd Generation Partnership Project; Technical Specification Group Radio Access Network; Evolved Universal Terrestrial Radio Access (E-UTRA); Radio Link Control (RLC) protocol specification (Release 15)", Jul. 2018.
3GPP TS 36.323 V15.0.0, "3rd Generation Partnership Project; Technical Specification Group Radio Access Network; Evolved Universal Terrestrial Radio Access (E-UTRA); Packet Data Convergence Protocol (PDCP) specification (Release 15)", Jul. 2018.
3GPP TS 36.331 V15.2.2, "3rd Generation Partnership Project; Technical Specification Group Radio Access Network; Evolved Universal Terrestrial Radio Access (E-UTRA); Radio Resource Control (RRC); Protocol specification (Release 15)", Jun. 2018.
3GPP TS 36.413 V15.2.0, "3rd Generation Partnership Project; Technical Specification Group Radio Access Network; Evolved Universal Terrestrial Radio Access Network (E-UTRAN); S1 Application Protocol (S1AP) (Release 15)", Jun. 2018.
3GPP TS 36.423 V15.2.0, "3rd Generation Partnership Project; Technical Specification Group Radio Access Network; Evolved Universal Terrestrial Radio Access Network (E-UTRAN); X2 application protocol (X2AP) (Release 15)", Jun. 2018.
3GPP TS 36.425 V15.0.0, "3rd Generation Partnership Project; Technical Specification Group Radio Access Network; Evolved Universal Terrestrial Radio Access Network (E-UTRAN); X2 interface user plane protocol (Release 15)", Jun. 2018.
3GPP TS 37.340 V15.2.0, "3rd Generation Partnership Project; Technical Specification Group Radio Access Network; Evolved Universal Terrestrial Radio Access (E-UTRA) and NR; Multi-connectivity; Stage 2 (Release 15)", Jun. 2018.
3GPP TS 38.201 V15.0.0, "3rd Generation Partnership Project; Technical Specification Group Radio Access Network; NR; Physical layer; General description (Release 15)", Dec. 2017.
3GPP TS 38.202 V15.2.0, "3rd Generation Partnership Project; Technical Specification Group Radio Access Network; NR; Services provided by the physical layer (Release 15)", Jun. 2018.
3GPP TS 38.211 V15.2.0, "3rd Generation Partnership Project; Technical Specification Group Radio Access Network; NR; Physical channels and modulation (Release 15)", Jun. 2018.
3GPP TS 38.212 V15.2.0, "3rd Generation Partnership Project; Technical Specification Group Radio Access Network; NR; Multiplexing and channel coding (Release 15)", Jun. 2018.
3GPP TS 38.213 V15.2.0, "3rd Generation Partnership Project; Technical Specification Group Radio Access Network; NR; Physical layer procedures for control (Release 15)", Jun. 2018.
3GPP TS 38.214 V15.2.0, "3rd Generation Partnership Project; Technical Specification Group Radio Access Network; NR; Physical layer procedures for data (Release 15)", Jun. 2018.
3GPP TS 38.215 V15.2.0, "3rd Generation Partnership Project; Technical Specification Group Radio Access Network; NR; Physical layer measurements (Release 15)", Jun. 2018.
3GPP TS 38.300 V15.2.0, "3rd Generation Partnership Project; Technical Specification Group Radio Access Network; NR; NR and NG-RAN Overall Description; Stage 2 (Release 15)", Jun. 2018.
3GPP TS 38.321 V15.2.0, "3rd Generation Partnership Project; Technical Specification Group Radio Access Network; NR; Medium Access Control (MAC) protocol specification (Release 15)", Jun. 2018.
3GPP TS 38.322 V15.2.0, "3rd Generation Partnership Project; Technical Specification Group Radio Access Network; NR; Radio Link Control (RLC) protocol specification (Release 15)", Jun. 2018.
3GPP TS 38.323 V15.2.0, "3rd Generation Partnership Project; Technical Specification Group Radio Access Network; NR; Packet Data Convergence Protocol (PDCP) specification (Release 15)", Jun. 2018.
3GPP TS 38.331 V15.2.1, "3rd Generation Partnership Project; Technical Specification Group Radio Access Network; NR; Radio Resource Control (RRC) protocol specification (Release 15)", Jun. 2018.
3GPP TS 38.401 V15.2.0, "3rd Generation Partnership Project; Technical Specification Group Radio Access Network; NG-RAN; Architecture description (Release 15)", Jun. 2018.
3GPP TS 38.410 V15.0.0, "3rd Generation Partnership Project; Technical Specification Group Radio Access Network; NG-RAN; NG general aspects and principles (Release 15)", Jun. 2018.
3GPP TS 38.413 V15.0.0, "3rd Generation Partnership Project; Technical Specification Group Radio Access Network; NG-RAN; NG Application Protocol (NGAP) (Release 15)", Jun. 2018.
3GPP TS 38.420 V15.0.0, "3rd Generation Partnership Project; Technical Specification Group Radio Access Network; NG-RAN; Xn general aspects and principles (Release 15)", Jun. 2018.
3GPP TS 38.423 V15.0.0, "3rd Generation Partnership Project; Technical Specification Group Radio Access Network; NG-RAN; Xn application protocol (XnAP) (Release 15)", Jun. 2018.
3GPP TS 38.470 V15.2.0, "3rd Generation Partnership Project; Technical Specification Group Radio Access Network; NG-RAN; F1 general aspects and principles (Release 15)", Jun. 2018.
3GPP TS 38.473 V15.2.1, "3rd Generation Partnership Project; Technical Specification Group Radio Access Network; NG-RAN; F1 application protocol (F1AP) (Release 15)", Jul. 2018.
3GPP TR 38.801 V14.0.0, "3rd Generation Partnership Project; Technical Specification Group Radio Access Network; Study on new radio access technology: Radio access architecture and interfaces (Release 14)", Mar. 2017.
3GPP TR 38.802 V14.2.0, "3rd Generation Partnership Project; Technical Specification Group Radio Access Network; Study on New Radio Access Technology Physical Layer Aspects (Release 14)", Sep. 2017.

(56) References Cited

OTHER PUBLICATIONS

3GPP TR 38.803 V14.2.0, "3rd Generation Partnership Project; Technical Specification Group Radio Access Network; Study on new radio access technology: Radio Frequency (RF) and co-existence aspects (Release 14)", Sep. 2017.

3GPP TR 38.804 V14.0.0, "3rd Generation Partnership Project; Technical Specification Group Radio Access Network; Study on New Radio Access Technology; Radio Interface Protocol Aspects (Release 14)", Mar. 2017.

3GPP TR 38.900 V15.0.0, "3rd Generation Partnership Project; Technical Specification Group Radio Access Network; Study on channel model for frequency spectrum above 6 GHz (Release 15)", Jun. 2018.

3GPP TR 38.912 V15.0.0, "3rd Generation Partnership Project; Technical Specification Group Radio Access Network; Study on New Radio (NR) access technology (Release 15)", Jun. 2018.

3GPP TR 38.913 V15.0.0, "3rd Generation Partnership Project; Technical Specification Group Radio Access Network; Study on Scenarios and Requirements for Next Generation Access Technologies; (Release 15)", Jun. 2018.

Molina-Masegosa et al., "LTE-V for Sidelink 5G V2X Vehicular Communications: A New 5G Technology for Short-Range Vehicle-to-Everything Communications", IEEE Vehicular Technology Magazine, vol. 12, Issue 4, Dec. 2017.

Notice of Reasons for Refusal issued by the Japan Patent Office for corresponding Japanese Patent Application No. 2020-556416, dated Jun. 14, 2022, with an English translation.

* cited by examiner

COMMUNICATION DEVICE, WIRELESS COMMUNICATION SYSTEM, AND RESOURCE SELECTING METHOD

CROSS-REFERENCE TO RELATED APPLICATION(S)

This application is a continuation of International Application No. PCT/JP2018/041406, filed on Nov. 7, 2018, the entire contents of which are incorporated herein by reference.

FIELD

The embodiments discussed herein are related to a communication device, a wireless communication system, and a resource selecting method.

BACKGROUND

In the current networks, traffic of mobile terminals (smartphones and feature phones) occupies most of network resources. Furthermore, traffic used by mobile terminals tends to be continuously increased in the future.

In contrast, with the development of Internet of things (IoT) services (for example, transportation systems, smart meters, monitoring systems for devices, and the like), there is a need to cope with services having various kinds of requirements. Thus, in the communication standards for the fifth generation mobile communication (5G or new radio (NR)), in addition to the standard technology of the fourth generation mobile communication (4G) (for example, Non-Patent Documents 2 to 12), there is a demand for a technology that implements high-data-rate, high-capacity, and low-latency communication. Furthermore, regarding the fifth generation communication standards, technical studies are being conducted in 3GPP working groups (for example, TSG-RAN WG1, TSG-RAN WG2, and the like).

As described above, in 5G, in order to respond various kinds of services, support of a lot of use cases classified into enhanced mobile broadband (eMBB), machine type communications (Massive MTC), and ultra-reliable and low latency communication (URLLC) is conceived.

Furthermore, in the 3GPP working groups, Vehicle to Everything (V2X) communication is also discussed. V2X is a general name of Vehicle to Vehicle (V2V) indicating communication between automobiles; Vehicle to Pedestrian (V2P) indicating communication between automobile and pedestrians; Vehicle to Infrastructure (V2I) indicating communication between automobiles and road infrastructures, such as indicators; Vehicle to Network (V2N) indicating communication between automobiles and networks; and the like each of which uses sidelink channels. Prescriptions related to V2X is described in, for example, Non-Patent Document 1.

Regarding a resource arrangement in V2X, studies are being conducted on an arrangement method for adjoining a control channel to a data channel and an arrangement method for not adjoining a control channel to a data channel. Specifically, FIG. 1 is a diagram illustrating an example of a resource arrangement in which physical sidelink control channels (PSCCHs) of control channels indicated by oblique lines in the drawing and physical sidelink shared channels (PSSCHs) of data channels are adjoined in a direction of the frequency axis. In FIG. 1, the resources of the PSCCHs and the PSSCHs that are actually used for transmission are indicated by bold oblique lines and horizontal lines, respectively. Furthermore, in FIG. 1, slots SL1 to SL8 are illustrated in the time axis direction. Sidelink control information (SCI) including information related to a modulation scheme and an encoding rate of data of associated PSSCHs and the like is mapped onto the resource of the PSCCHs indicated by the bold oblique lines in the drawing.

In contrast, FIG. 2 is a diagram illustrating an example of a resource arrangement in which the PSCCHs and the PSSCHs indicated by the oblique lines in the drawing are not adjacent in the frequency axis. In also FIG. 2, the resources of the PSCCHs and the PSSCHs that are actually used for transmission are indicated by bold oblique lines and horizontal lines, respectively, and the slots SL1 to SL8 are illustrated in the time axis direction. In FIG. 2, although the PSCCHs and the PSSCHs that are associated with each other are not adjoined; however, SCI related to the associated PSSCHs are mapped onto the resources of the PSCCHs indicated by the bold oblique lines in the drawing.

Examples of a technique for allocating these resources include a technique in which a mobile communication system centrally performs control and a technique in which each terminal device that performs V2X autonomously performs control. The technique in which the mobile communication system centrally performs control is applicable when a terminal device that performs V2X is present in a coverage of the mobile communication system and is also called a "mode 1" in NR-5G. In contrast, the technique in which each terminal device autonomously performs control is applicable even when each of the terminal devices is not present in the coverage of the mobile communication system and is also called a "mode 2" in NR-5G. In the mode 2, because communication for allocating a resource between the terminal device and the mobile communication system is not performed, transmission delay in a case where transmission data is generated in the terminal device is shortened and it is thus possible to satisfy a strict latency requirement.

In the mode 2, each of the terminal devices performs sensing of a frequency band that is used for V2X and, if transmission data is generated, each of the terminal devices excludes the resource that is highly likely to be used by another terminal device based on the result of the sensing and selects a resource that is used to transmit the data. Specifically, for example, as illustrated in FIG. 3, when transmission data of a certain terminal device is generated in time T, the terminal device sets a selection window having the time width in accordance with latency that is allowed for the transmission data. Then, the terminal device excludes, based on the result of the sensing obtained up to the time T, the resources that are highly likely to be used by the other terminal device included in the selection window. In FIG. 3, for example, the resources indicated by the bold oblique lines and the horizontal lines are excluded. Then, the terminal device selects one of the remaining resources that are not excluded in the selection window, maps the transmission data onto the selected resource, and transmits the transmission data.

Non-Patent Document 1: 3GPP TS 22.186 V16.0.0 (2018-09)
Non-Patent Document 2: 3GPP TS 36.211 V15.2.0 (2018-06)
Non-Patent Document 3: 3GPP TS 36.212 V15.2.1 (2018-07)
Non-Patent Document 4: 3GPP TS 36.213 V15.2.0 (2018-06)
Non-Patent Document 5: 3GPP TS 36.300 V15.2.0 (2018-06)

Non-Patent Document 6: 3GPP TS 36.321 V15.2.0 (2018-07)
Non-Patent Document 7: 3GPP TS 36.322 V15.1.0 (2018-07)
Non-Patent Document 8: 3GPP TS 36.323 V15.0.0 (2018-07)
Non-Patent Document 9: 3GPP TS 36.331 V15.2.2 (2018-06)
Non-Patent Document 10: 3GPP TS 36.413 V15.2.0 (2018-06)
Non-Patent Document 11: 3GPP TS 36.423 V15.2.0 (2018-06)
Non-Patent Document 12: 3GPP TS 36.425 V15.0.0 (2018-06)
Non-Patent Document 13: 3GPP TS 37.340 V15.2.0 (2018-06)
Non-Patent Document 14: 3GPP TS 38.201 V15.0.0 (2017-12)
Non-Patent Document 15: 3GPP TS 38.202 V15.2.0 (2018-06)
Non-Patent Document 16: 3GPP TS 38.211 V15.2.0 (2018-06)
Non-Patent Document 17: 3GPP TS 38.212 V15.2.0 (2018-06)
Non-Patent Document 18: 3GPP TS 38.213 V15.2.0 (2018-06)
Non-Patent Document 19: 3GPP TS 38.214 V15.2.0 (2018-06)
Non-Patent Document 20: 3GPP TS 38.215 V15.2.0 (2018-06)
Non-Patent Document 21: 3GPP TS 38.300 V15.2.0 (2018-06)
Non-Patent Document 22: 3GPP TS 38.321 V15.2.0 (2018-06)
Non-Patent Document 23: 3GPP TS 38.322 V15.2.0 (2018-06)
Non-Patent Document 24: 3GPP TS 38.323 V15.2.0 (2018-06)
Non-Patent Document 25: 3GPP TS 38.331 V15.2.1 (2018-06)
Non-Patent Document 26: 3GPP TS 38.401 V15.2.0 (2018-06)
Non-Patent Document 27: 3GPP TS 38.410 V15.0.0 (2018-06)
Non-Patent Document 28: 3GPP TS 38.413 V15.0.0 (2018-06)
Non-Patent Document 29: 3GPP TS 38.420 V15.0.0 (2018-06)
Non-Patent Document 30: 3GPP TS 38.423 V15.0.0 (2018-06)
Non-Patent Document 31: 3GPP TS 38.470 V15.2.0 (2018-06)
Non-Patent Document 32: 3GPP TS 38.473 V15.2.1 (2018-07)
Non-Patent Document 33: 3GPP TR 38.801 V14.0.0 (2017-03)
Non-Patent Document 34: 3GPP TR 38.802 V14.2.0 (2017-09)
Non-Patent Document 35: 3GPP TR 38.803 V14.2.0 (2017-09)
Non-Patent Document 36: 3GPP TR 38.804 V14.0.0 (2017-03)
Non-Patent Document 37: 3GPP TR 38.900 V15.0.0 (2018-06)
Non-Patent Document 38: 3GPP TR 38.912 V15.0.0 (2018-06)
Non-Patent Document 39: 3GPP TR 38.913 V15.0.0 (2018-06)
Non-Patent Document 40: Rafael Molina-Masegosa et al., "LTE-V for Sidelink 5G V2X Vehicular Communications: A New 5G Technology for Short-Range Vehicle-to-Everything Communications", IEEE Vehicular Technology Magazine Volume 12 Issue 4, December 2017

Incidentally, the terminal device that performs V2X sometimes performs half-duplex communication (Half-Duplex) in which transmission and reception are not simultaneously performed in order to reduce, for example, costs. The terminal device that performs half-duplex communication does not receive data transmitted from the other terminal device during transmission of data.

Accordingly, for example, when a plurality of terminal devices located in the vicinity simultaneously transmits data, the transmitted data is not received by the terminal device that is in a process of data transmission, and there is a problem in that a reception rate of data is reduced. Here, the reception rate can be represented by a ratio of, for example, the number of terminal devices that have received the data to the number of terminal devices located within a predetermined range from the transmission source of the data. An example of this type of reception rate includes the packet reception ratio (PRR).

If the reception rate of the data is reduced, there may sometimes be a case in which reliability requested for the wireless communication system is not satisfied. Namely, for example, in a wireless communication system for an automatic operation or the like, although high reliability, such as 99.99 to 99.999%, is requested, when a terminal device performs half-duplex communication, the reception rate of the data is reduced and it is thus difficult to satisfy the requested reliability.

SUMMARY

According to an aspect of an embodiment, a communication device includes: a processor that selects a first resource such that the first resource that is used to transmit data by the communication device does not temporally overlap with a second resource that is used to transmit data by another communication device located in vicinity of the communication device; and a transmitter that transmits data by using the first resource selected by the processor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. Furthermore, the present invention is not limited to the embodiments.

[a] First Embodiment

Figure 4:
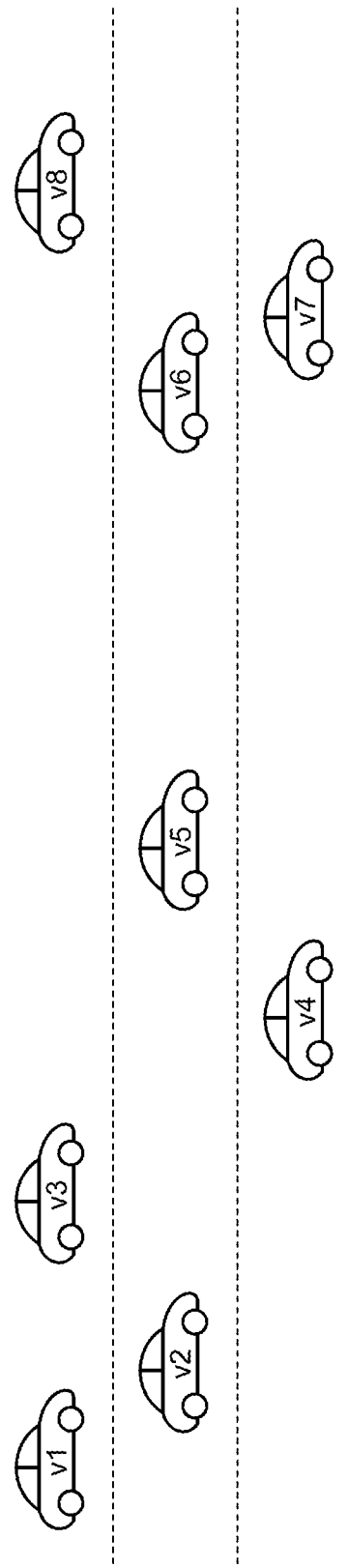
FIG. 4 is a diagram illustrating an example of a wireless communication system according to a first embodiment.

FIG. 4 is a diagram illustrating an example of a wireless communication system according to a first embodiment. As illustrated in FIG. 4, the wireless communication system includes a plurality of terminal devices v1 to v8 provided on a plurality of automobiles. Here, the eight terminal devices v1 to v8 are illustrated; however, the number of terminal devices is not limited to eight. Furthermore, in FIG. 4, it is assumed that the wireless communication system is constituted by only the terminal devices included in the automobiles; however, the wireless communication system may also include a terminal device that performs communication with a pedestrian or a road infrastructure in V2X.

Each of the terminal devices is capable of performing half-duplex communication with each other and performs, at the time of transmitting data, multicast (group cast) on data to all of the terminal devices, as the destination, that are capable of performing communication located within the range. Accordingly, the data transmitted by a single terminal device can be received by all of the other terminal devices that are capable of performing communication. However, because the terminal device performs half-duplex communication, if a plurality of terminal devices simultaneously transmits data, these pieces of data are not received by the terminal device that is in a process of data transmission. Furthermore, in general, data transmitted by a single terminal device can be directly received by the other terminal devices that are capable of performing communication located within the range; however, if the terminal device are located in a distributed manner in a wide range, the terminal device that has directly received the data may also relay the data to the terminal device located far away.

The terminal device performs, prior to transmission of data, sensing on the frequency band that is used for V2X, excludes the resource that is highly likely to be used by the other terminal device based on the sensing result, and selects the resource that is used to transmit the data. At this time, the terminal device also excludes the resource that temporally overlaps with the resource that is used by the terminal device located in the vicinity of the own device. Namely, the terminal device selects the resource that is used to transmit data by the own device so as not occur simultaneous transmission with respect to a nearby terminal device.

Figure 5:
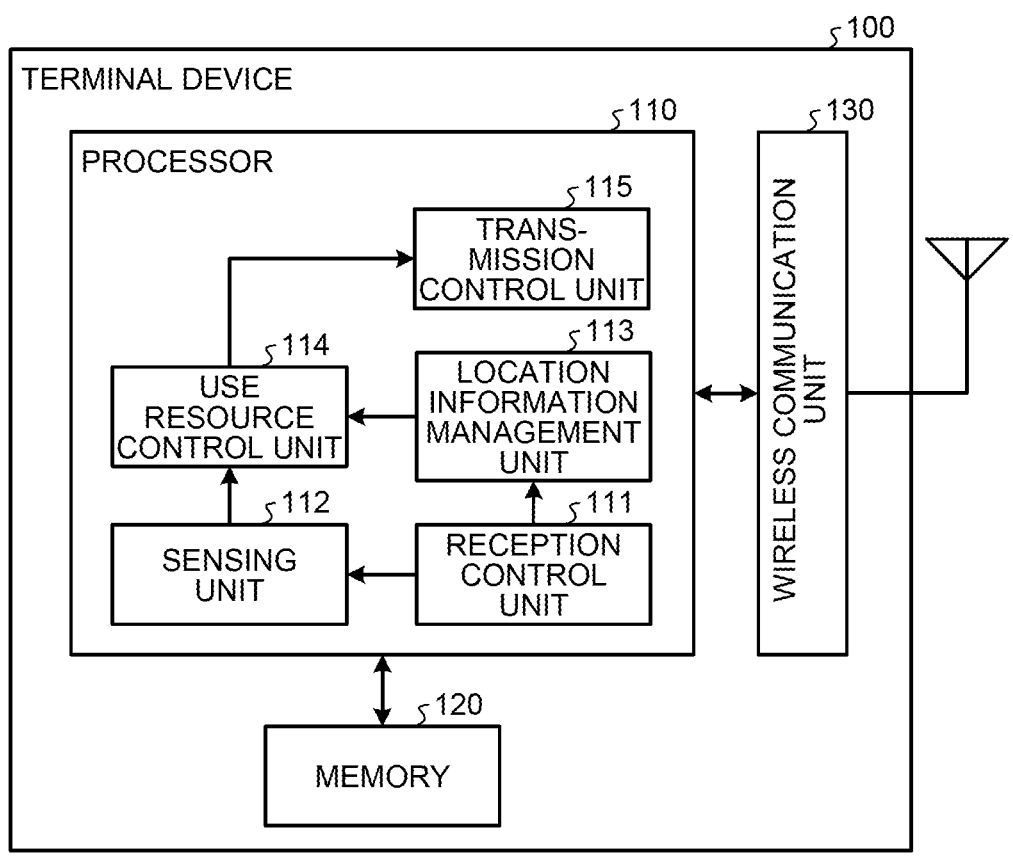
FIG. 5 is a block diagram illustrating a configuration of a terminal device according to the first embodiment.

FIG. 5 is a block diagram illustrating a configuration of a terminal device 100 according to the first embodiment. The terminal device 100 illustrated in FIG. 5 includes a processor 110, a memory 120, and a wireless communication unit 130.

The processor 110 includes, for example, a central processing unit (CPU), a field programmable gate array (FPGA) or a digital signal processor (DSP), and performs overall control of the terminal device 100. Specifically, the processor 110 includes a reception control unit 111, a sensing unit 112, a location information management unit 113, a use resource control unit 114, and a transmission control unit 115.

The reception control unit 111 demodulates and decodes the reception data received from the other terminal devices. At this time, first, the reception control unit 111 performs demodulation and decoding on a PSCCH and performs, if data addressed to the terminal device 100 is present, demodulation and decoding on the associated PSSCH by using SCI included in the PSCCH. The reception data received by the reception control unit 111 includes, for example, location information on each of the terminal devices periodically transmitted by each of the terminal devices.

The sensing unit 112 performs sensing that detects whether the resource is used to perform communication by the other terminal device. Specifically, the sensing unit 112 receives, in a predetermined sensing period, SCI in the overall frequency bands that are used to perform V2X communication, measures reception power of each subchannel in each slot, and judges whether the other terminal device is transmitting a signal in each of the slots and the subchannels. In a description below, the resource that is used by the other terminal device to transmit a signal is referred to as a "busy" resource and the resource that is not used by the other terminal device to transmit a signal is referred to as an "idle" resource.

The location information management unit 113 collects location information that is periodically transmitted from the other terminal device located in the range in which communication can be performed with the terminal device 100 and specifies the location of the other terminal device. Furthermore, the location information management unit 113 acquires location information on the terminal device 100. Specifically, the location information management unit 113 acquires the location information on the terminal device 100 by using, for example, the global positioning system (GPS). Furthermore, instead of collecting the location information from the other terminal device, the location information management unit 113 may also measure reception power of the signal transmitted from the other terminal device, calculate a propagation loss based on the reception power, and estimate the distance between the terminal device 100 and the other terminal device.

The use resource control unit 114 decides, based on the result of sensing obtained by the sensing unit 112 and the location information on each of the terminal devices, the resource that is used by the terminal device 100 to transmit the signal. Specifically, when a packet to be transmitted is generated, the use resource control unit 114 sets a selection window that is in accordance with allowable latency of the packet. Then, the use resource control unit 114 specifies idle resources in the selection window based on the result of sensing and selects a resource that is used to transmit a packet from the idle resources. At this time, the use resource control unit 114 calculates the distance between the terminal device 100 and each of the terminal devices based on the location information and specifies the terminal device located within a predetermined range from the terminal device 100 (hereinafter, referred to as a "within-range terminal device"). Then, the use resource control unit 114 selects the resource that does not temporally overlap with the resource that is used by the within-range terminal device and that is included in the idle resources. Namely, the use resource control unit 114 selects the resource that is used to transmit the packet by excluding the same slot as that of the resource used by the within-range terminal device from the idle resources included in the selection window.

The transmission control unit 115 performs control such that the packet is transmitted by using the resource selected by the use resource control unit 114. Namely, the transmission control unit 115 encodes and modulates data and maps the packet onto the resource selected by the use resource control unit 114. Then, the transmission control unit 115 transmits the transmission data obtained from the mapping via the wireless communication unit 130.

The memory 120 includes, for example, a random access memory (RAM) or a read only memory (ROM), or the like and stores information that is used by the processor 110 to perform processes.

The wireless communication unit 130 performs a wireless transmission process, such as digital/analog (D/A) conversion and up-conversion, on the transmission data generated by the processor 110 and performs wireless transmission via an antenna. Furthermore, the wireless communication unit 130 performs a wireless reception process, such as down-conversion and analog/digital (A/D) conversion, on the reception data that has been wirelessly received via the antenna and then outputs the data to the processor 110. Because the wireless communication unit 130 performs half-duplex communication, the wireless communication unit 130 does not simultaneously perform transmission and reception.

Figure 6:
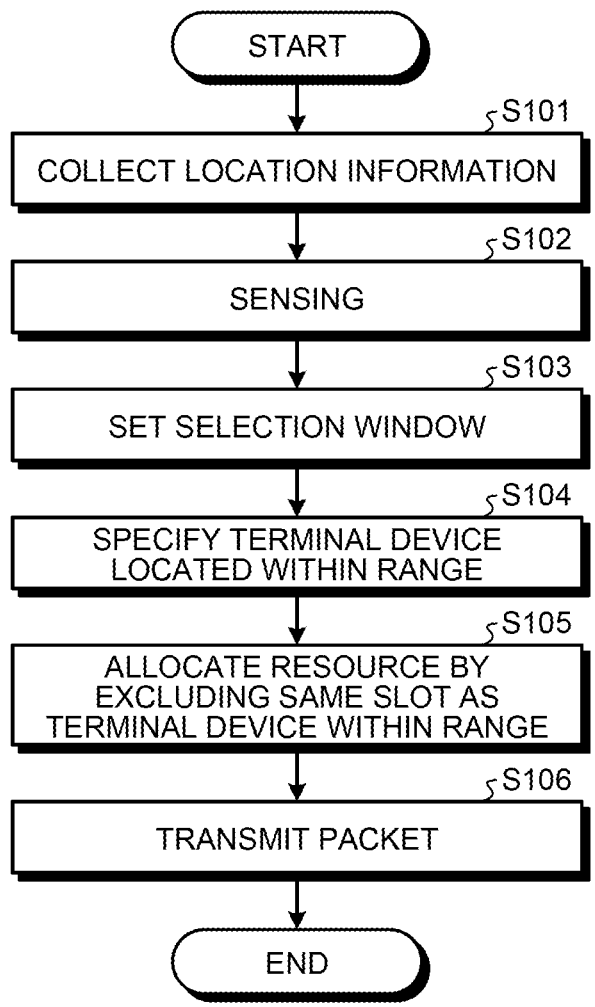
FIG. 6 is a flowchart illustrating a packet transmission process according to the first embodiment.

In the following, a packet transmission process performed by the terminal device 100 having the configuration described above will be described with reference to the flowchart illustrated in FIG. 6.

Each of the terminal devices that performs V2X periodically measures the own position by using, for example, the GPS and transmits the own location information. The location information transmitted from each of the other terminal devices is received by the wireless communication unit 130, is subjected to a reception process performed by the reception control unit 111, and is collected by the location information management unit 113 (Step S101). Similarly to the other terminal devices, the terminal device 100 also periodically acquires the own location information, and then, the location information is managed by the location information management unit 113 together with the location information on the other terminal devices.

Furthermore, in the sensing period in which transmission of a packet is not performed, sensing of the frequency band used for V2X is performed by the sensing unit 112 (Step S102). Namely, SCI on overall frequency band used for V2X communication is received, and the reception power of each of the subchannels in the associated slots is measured by the sensing unit 112 and it is judged whether the other terminal device is transmitting a signal in each of the slots and the subchannels.

Then, if a packet to be transmitted is generated, a selection window having a time width that is in accordance with the latency allowed for the packet is set by the use resource control unit 114 (Step S103). Furthermore, the location information managed by the location information management unit 113 is referred to by the use resource control unit 114 and the within-range terminal device located within a predetermined range from the terminal device 100 is specified (Step S104). The within-range terminal device is a terminal device whose distance from, for example, the terminal device 100 is less than a predetermined distance.

Then, the idle resources in the selection window are extracted by the use resource control unit 114 based on the sensing result in the sensing period. Namely, in accordance with the periodicity of the busy resources that are used by the other terminal devices in the sensing period, the resources that are highly likely to be used by the other terminal devices are excluded from the resources in the selection window and the remaining idle resources are extracted. Furthermore, the resource excluded from the resource that temporally overlaps with the resource that is highly likely to be used by the within-range terminal device from among the idle resources by the use resource control unit 114 is allocated to the terminal device 100 (Step S105). Namely, the slots used by the within-range terminal device from among the plurality of slots included in the selection window are excluded by the use resource control unit 114 and the remaining idle resources are allocated to the terminal device 100.

The resource allocation decided by the use resource control unit 114 is notified to the transmission control unit 115 and control is performed by the transmission control unit 115 such that the packet is transmitted by using the allocated resource. Then, the packet is transmitted from the wireless communication unit 130 via the antenna (Step S106).

In this way, by allocating resources such that the resource used by the terminal device 100 does not overlap with the resource used by the within-range terminal device, it is possible to reduce the possibility that a plurality of terminal devices located in the vicinity simultaneously performs transmission. As a result, it is possible to improve a possibility of receiving a packet sent from the terminal device 100 by the nearby terminal device and it is possible to improve a possibility of receiving a packet sent from the nearby terminal device by the terminal device 100. Namely, it is possible to improve the reception rate of data within a predetermined range from the terminal device 100.

Figure 7:
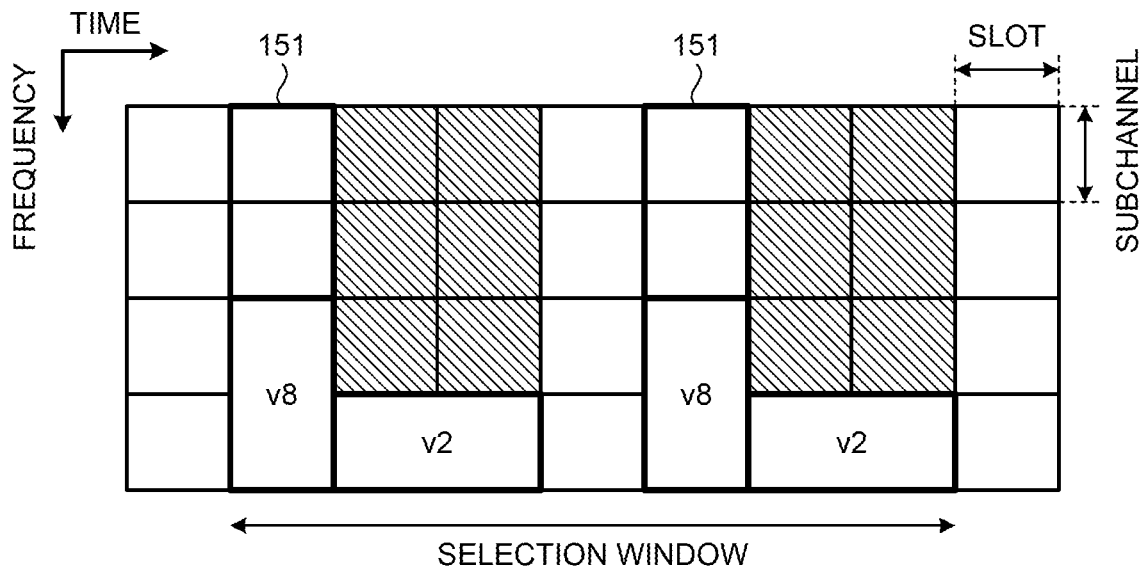
FIG. 7 is a diagram illustrating an example of resource selection according to the first embodiment.

FIG. 7 is a diagram illustrating a specific example of resource selection according to the first embodiment. FIG. 7 is a diagram illustrating the selection of a resource used by, for example, the terminal device v1 illustrated in FIG. 4. As illustrated in FIG. 7, regarding the resource used for V2X, a slot is used as a unit in the time direction and a subchannel is used in the frequency direction. The resource allocation of V2X is performed by using, for example, a block of a single slot and a single subchannel as a unit.

The terminal device v1 specifies the busy resources used by the other terminal devices v2 and v8 in the sensing period. Then, if a packet to be transmitted is generated, the terminal device v1 sets a selection window. In the selection window, the resources that are highly likely to be used by, for example, terminal devices v2 and v8 are excluded from the result of sensing in the sensing period. Furthermore, because the terminal device v1 is located in the vicinity of the terminal device v2 and the terminal device v2 is the within-range terminal device with respect to the terminal device v1, the resources that temporally overlap with the resources used by the terminal device v2 are excluded. Namely, the resources indicated by the oblique line illustrated in FIG. 7 are excluded. Then, for example, resources 151 that remain and that are not excluded in the selection window are selected and the terminal device v1 transmits the packet by using the resources 151.

Because the terminal device v1 transmits the packet by using the resources 151, the terminal device v8 that uses the same slots does not receive the packet transmitted from the terminal device v1. However, the distance between the terminal device v1 and the terminal device v8 is large and there may be a possibility that the terminal device v8 is not the destination of the packet transmitted by the terminal device v1. Accordingly, an influence of simultaneous transmission performed by the terminal device v1 and the terminal device v8 is limited.

In contrast, the terminal device v1 is located in the vicinity of the terminal device v2, and thus, the possibility that the terminal device v2 becomes the destination of the packet transmitted by the terminal device v1 is high. According to the resource selection described above, because the terminal device v1 and the terminal device v2 do not simultaneously perform transmission, the packet transmitted by the terminal device v1 can be received by the terminal device v2, whereas the packet transmitted by the terminal device v2 can be received by the terminal device v1. Namely, because each of the terminal devices located within a predetermined range performs transmission at different timing, the reception rate of data, such as PRR, within a predetermined range is high.

As described above, according to the embodiment, based on the location information on each of the terminal devices, the terminal device selects the resource that does not temporally overlap with the terminal device located within a predetermined range from the own device and transmits the packet. Consequently, the terminal devices located in the vicinity do not simultaneously perform transmission and, even when the terminal device performs half-duplex communication, it is possible to enhance a possibility of receiving the packet transmitted from the terminal device located within a predetermined range. In other words, it is possible to improve the reception rate of data.

[b] Second Embodiment

The characteristic of a second embodiment is that resources are finally selected by considering, in the time width of the resource to be selected, a reception signal intensity in the frequency band that is selected and a reception signal intensity in the frequency band that is not selected.

Figure 1:
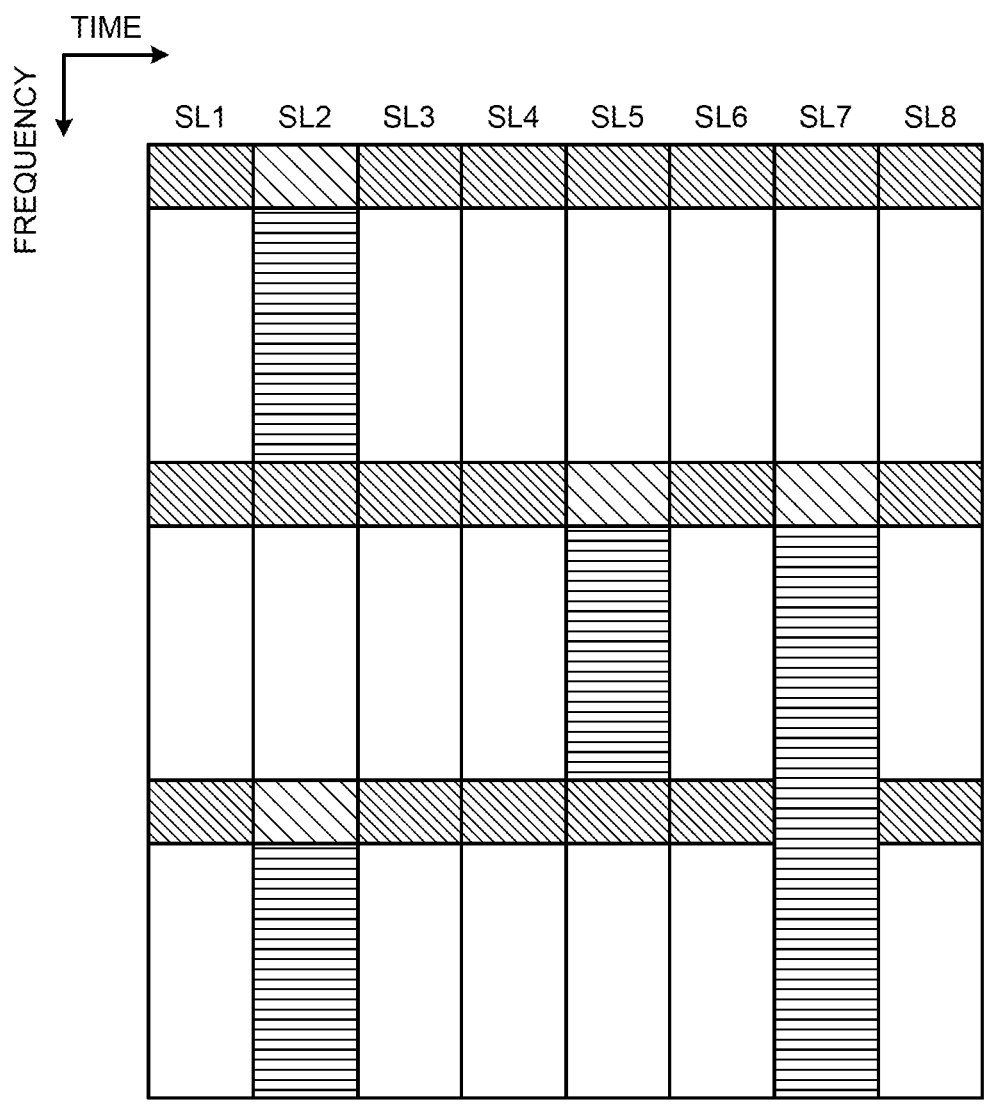
FIG. 1 is a diagram illustrating an example of a resource arrangement of V2X.
Figure 2:
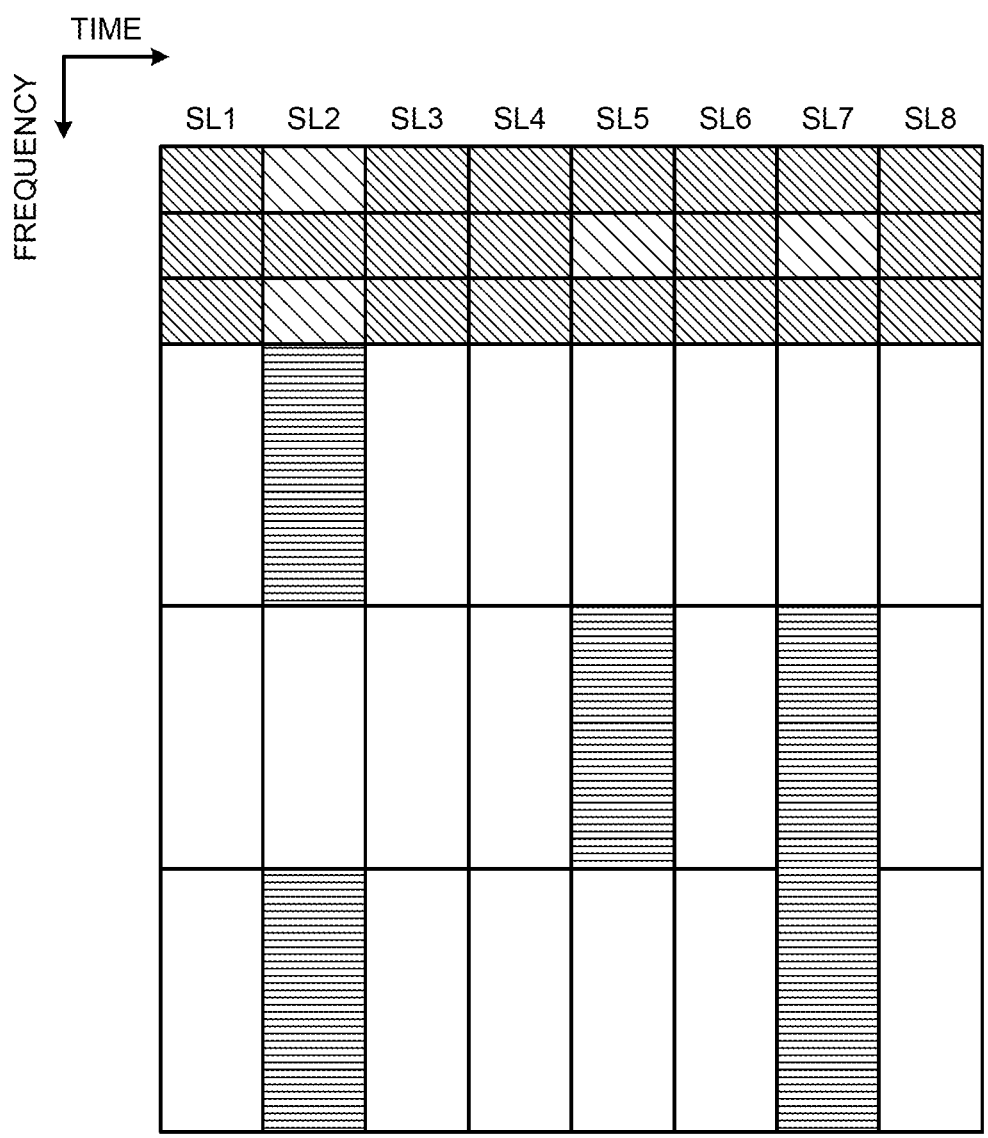
FIG. 2 is a diagram illustrating another example of the resource arrangement of V2X.
Figure 3:
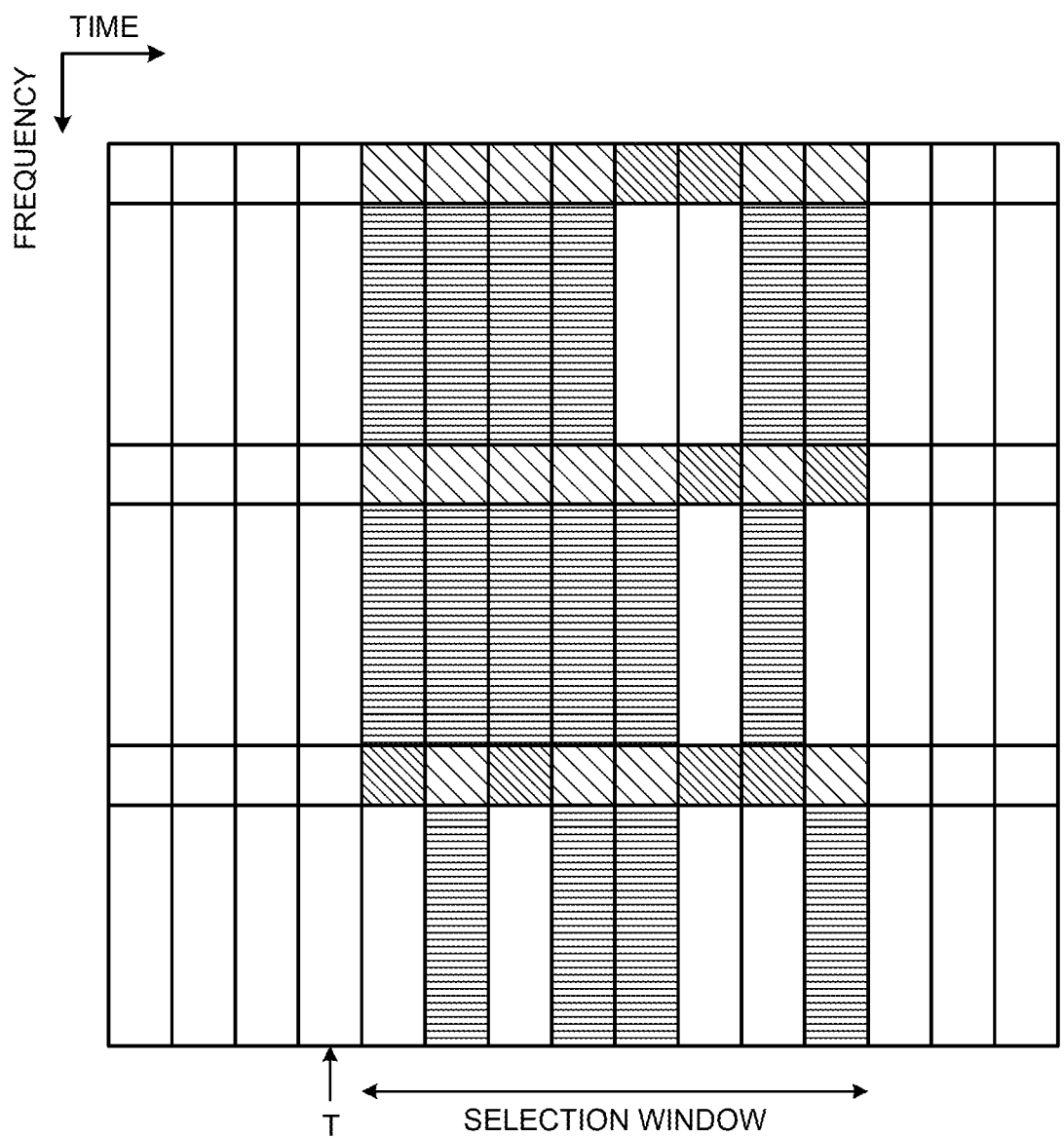
FIG. 3 is a diagram illustrating selecting of a resource.

A configuration of the wireless communication system according to the second embodiment is the same as that of the first embodiment (FIG. 1); therefore, descriptions thereof will be omitted.

Figure 8:
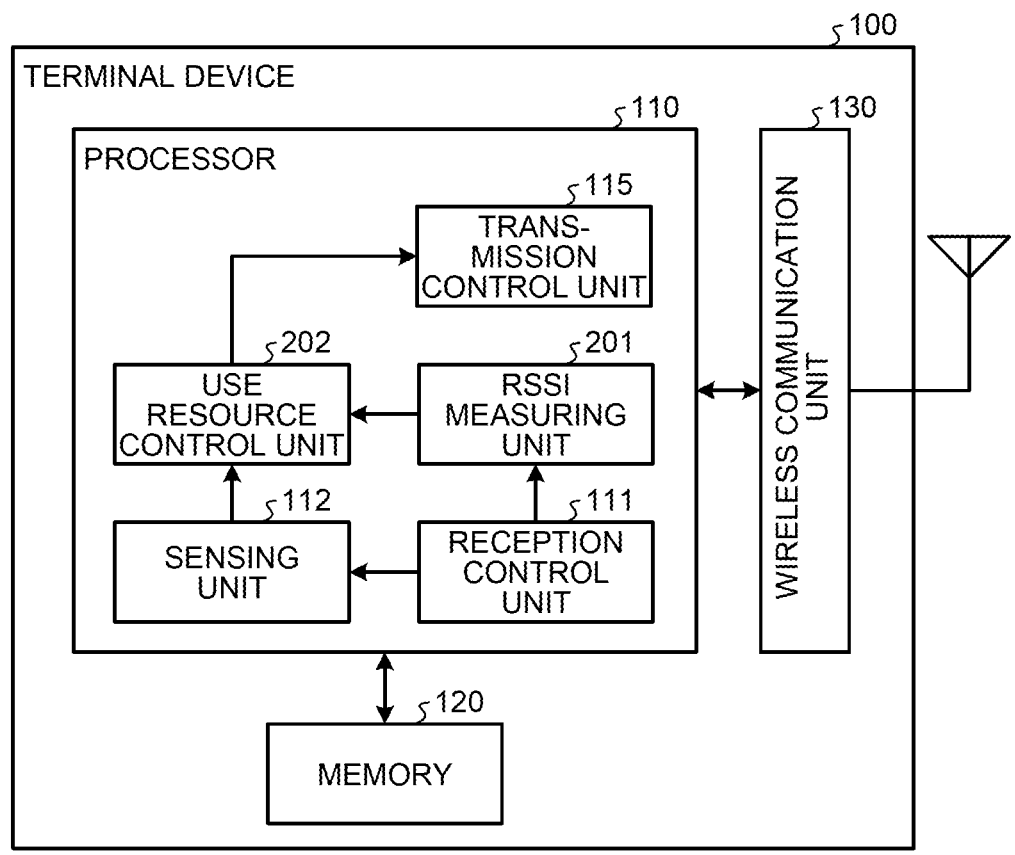
FIG. 8 is a block diagram illustrating a configuration of a terminal device according to a second embodiment.

FIG. 8 is a block diagram illustrating the configuration of the terminal device 100 according to the second embodiment. In FIG. 8, components that are the same as those illustrated in FIG. 5 are assigned the same reference numerals and descriptions thereof will be omitted. The terminal device 100 illustrated in FIG. 8 includes a received signal strength indicator (RSSI) measuring unit 201 and a use resource control unit 202, instead of the location information management unit 113 and the use resource control unit 114 included in the terminal device 100 illustrated in FIG. 5.

The RSSI measuring unit 201 measures RSSI for each slot and subchannel. Namely, regarding each of the blocks in the resource used for V2X, the RSSI measuring unit 201 measures RSSI indicating the intensity of a reception signal that includes a desired signal addressed to the terminal device 100 and a noise signal that is not addressed to the terminal device 100. It is conceivable that the block having a large RSSI is the resource that is used by the terminal device located in the vicinity of the terminal device 100 and it is conceivable that the block having a small RSSI is the resource that is not used by the terminal device located in the vicinity of the terminal device 100. Furthermore, the RSSI measuring unit 201 may also measure an index related to another type of wireless communication instead of the RSSI.

Namely, the RSSI measuring unit 201 may also measure, for example, reference signal received power (RSRP) or reference signal received quality (RSRQ) instead of the RSSI.

The use resource control unit 202 decides, based on the sensing result obtained by the sensing unit 112 and the RSSI for each resource block, the resource that is used by to transmit a signal the terminal device 100. Specifically, when a packet to be transmitted is generated, the use resource control unit 202 sets a selection window that is in accordance with the allowable latency of the packet. Then, the use resource control unit 202 specifies idle resources included in the selection window based on the sensing result and selects the resource that is used to transmit the packet from the idle resources. At this time, the use resource control unit 202 calculates an overall reception intensity for each resource candidate that is used to transmit a packet based on the RSSI of the block that is used to transmit a packet (hereinafter, referred to as a "in-band block") and the RSSI of the block in which slot is the same as that of the in-band block and the subchannel is different from that of the in-band block (hereinafter, referred to as an "out-of-band block"). Then, the use resource control unit 202 decides that the resource candidate in which the overall reception intensity is the smallest as the resource that is used to transmit the packet.

Specifically, the use resource control unit 202 calculates an overall reception intensity $P_{RSSI,i}$ indicated by, for example, Expression (1) below for each resource candidate.

$$P_{RSSI,i} = \alpha_i P_{in} + \beta_i P_{out}/\gamma \quad (1)$$

where, in Expression (1), i denotes an index of a terminal device, $P_{in}$ denotes a total value of the RSSI of in-band blocks, and $P_{out}$ indicates a total value of the RSSI of out-of-band blocks. Furthermore, $\alpha_i$ and $\beta_i$ are weighting coefficients of $P_{in}$ and $P_{out}$, respectively and satisfies $\alpha_i + \beta_i = 1$. $\gamma$ is a coefficient for normalizing the RSSI of the out-of-band blocks. The reason for normalizing the RSSI of the out-of-band blocks is that the number of in-band blocks is constant and corresponds to the number of blocks to be used for packet transmission, whereas the number of out-of-band blocks that are in the blocks in each of which the slot is the same as that of the in-band block is not constant depending on the arrangement location of the in-band block.

The use resource control unit 202 calculates the overall reception intensity represented by Expression (1) above for each candidate for use resource selected from the idle resources and decides, as the use resource, the candidate in which the overall reception intensity is the smallest.

Figure 9:
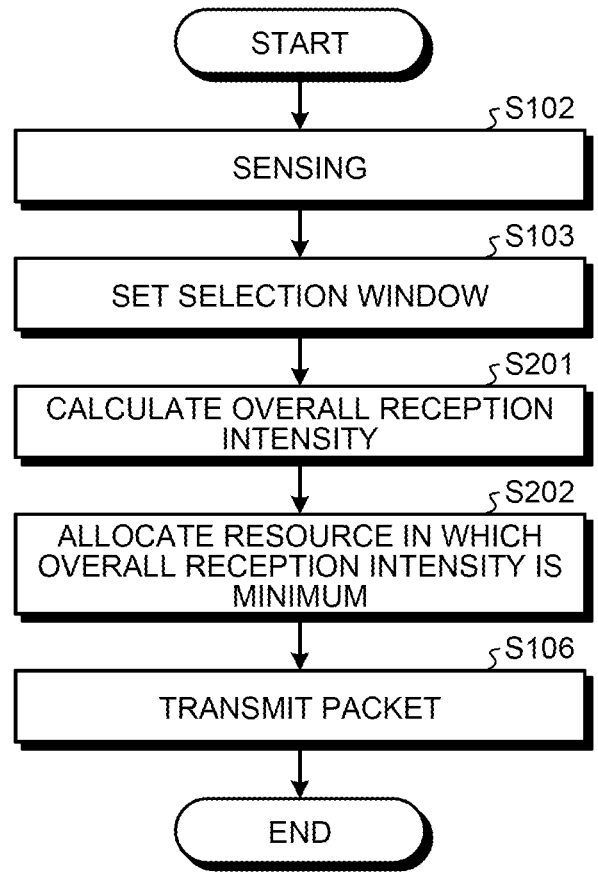
FIG. 9 is a flowchart illustrating a packet transmission process according to the second embodiment.

In the following, the packet transmission process performed by the terminal device 100 having the configuration described above will be described with reference to the flowchart illustrated in FIG. 9. In FIG. 9, components that are the same as those illustrated in FIG. 6 are assigned the same reference numerals and descriptions thereof in detail will be omitted.

In the sensing period in which transmission of a packet is not performed, sensing of the frequency band that is used by V2X is performed by the sensing unit 112 (Step S102). In the sensing period, the RSSI for each resource block is measured by the RSSI measuring unit 201. The RSSI measured in this period is used to calculate an overall reception intensity that will be described later.

Then, if a packet to be transmitted is generated, a selection window associated with the time width that is in accordance with the latency allowable for the packet is set by the use resource control unit 202 (Step S103). Then, the idle resources included in the selection window are extracted by the use resource control unit 202 based on the sensing result in the sensing period. Namely, in accordance with the periodicity of the busy resource in the sensing period used by the other terminal device, the resources that are highly likely to be used by the other terminal devices are excluded from the resource included in the selection window and the remaining idle resources are extracted. Furthermore, the candidates for the use resource are sequentially set from the idle resources by the use resource control unit 202, and the overall reception intensity is calculated for each candidate for the use resource (Step S201).

Namely, the overall reception intensity is calculated by Expression (1) above for each candidate for the use resource that can be used to transmit a packet. At this time, the total value $P_{in}$ of the RSSI of the in-band blocks and the total value $P_{out}$ of the RSSI of the out-of-band blocks are estimated from the RSSI for each block measured in the sensing period. Because the overall reception intensity indicates the magnitude of the RSSI in the time width associated with each of the candidates of the use resources, in the time width in which the overall reception intensity is small, the possibility that a nearby terminal device transmits a signal is low. Thus, the candidate in which the overall reception intensity is the smallest is decided to be the use resource by the use resource control unit 202 (Step S202).

The resource allocation decided by the use resource control unit 202 is notified to the transmission control unit 115 and control is performed by the transmission control unit 115 such that the packet is transmitted by using the allocated resource. Then, the packet is transmitted from the wireless communication unit 130 via the antenna (Step S106).

In this way, based on the RSSI for each block, by deciding the resource that is associated with time and in which the possibility that a nearby terminal device transmits a signal is small as the use resource, it is possible to reduce the possibility that a plurality of terminal devices located in the vicinity. As a result, it is possible to improve a possibility of receiving a packet transmitted from the terminal device 100 by a nearby terminal device and it is possible to improve a possibility of receiving a packet transmitted from the nearby terminal device by the terminal device 100. Namely, it is possible to improve the reception rate of data within a predetermined range from the terminal device 100.

Figure 10:
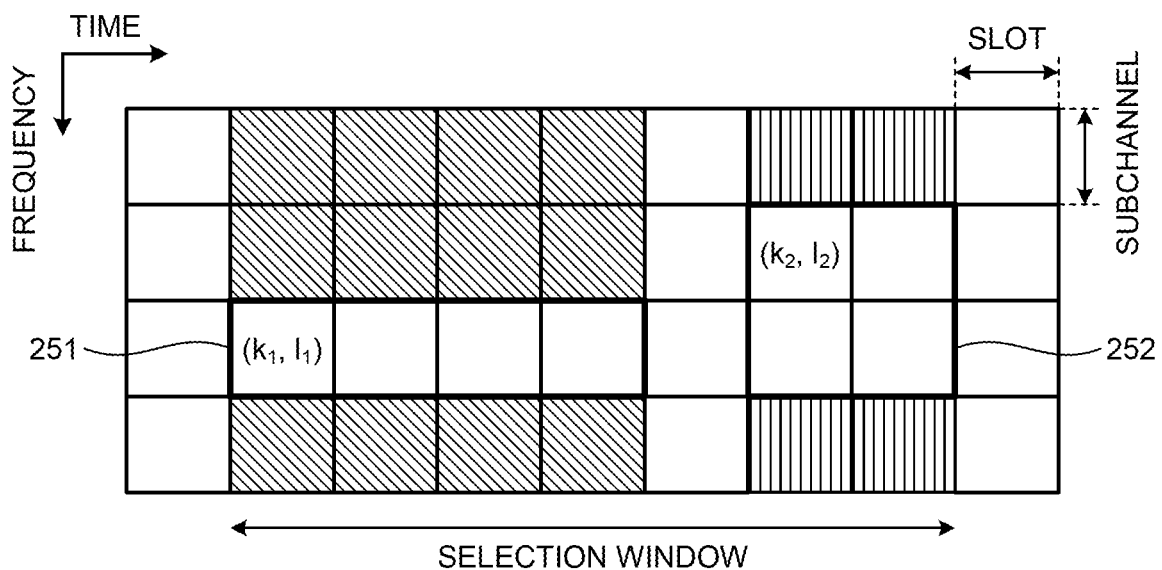
FIG. 10 is a diagram illustrating an example of resource selection according to the second embodiment.

FIG. 10 is a diagram illustrating a specific example of resource selection according to the second embodiment. As illustrated in FIG. 10, regarding the resources used for V2X, a slot is used as a unit in the time direction and a subchannel is used in the frequency direction. The resource allocation of V2X is performed by using, for example, a block of a single slot and a single subchannel as a unit.

The terminal device 100 specifies the busy resource that is used by the other terminal device in the sensing period. Then, if a packet to be transmitted is generated, the terminal device 100 sets a selection window. In the selection window, the resource that is highly likely to be used by the other terminal device is excluded from the sensing result in the sensing period. In FIG. 10, a description will be continued with the assumption that the resource to be excluded is not present in the selection window.

In a case in which the packet to be transmitted uses the resource by an amount corresponding to, for example, four blocks, candidates for use resources are, as illustrated in FIG. 10, a resource 251 in which the block indicated by ($k_1$, $l_1$) is the starting point, a resource 252 in which the block indicated by ($k_2$, $l_2$) is the starting point, and the like. These candidates for the use resource can be identified by the block corresponding to the starting point and the size in the time direction and the frequency direction. The use resource control unit 202 calculates an overall reception intensity represented by Expression (1) above for each of the candidates for the use resource.

Specifically, for example, if the resource 251 is the candidate for the use resource, the total value of the RSSI of the resource 251 corresponds to the total value Pi n of the RSSI of the in-band blocks and the total value of the RSSI of the blocks that are indicated by the oblique lines illustrated in the drawing and that overlap with the in-band block in the time direction is the total value $P_{out}$ of the RSSI of the out-of-band blocks. Similarly, for example, if the resource 252 is the candidate for the use resource, the total value of the RSSI of the resource 252 is the total value $P_{in}$ of the RSSI of the in-band blocks and the total value of the RSSI of the blocks that are indicated by the vertical lines illustrated in the drawing and that overlap with the in-band blocks in the time direction is the total value $P_{out}$ of the RSSI of the out-of-band blocks.

In this way, the overall reception intensity is calculated for each candidate of the use resource and the candidate having the smallest overall reception intensity is finally decided as the resource that is used to transmit a packet. If the overall reception intensity is the smallest, the possibility that the nearby terminal devices simultaneously performs transmission is low, therefore; the reception rate of data, such as PRR, within a predetermined range becomes high.

As described above, according to the embodiment, the terminal device transmits a packet by selecting, based on the RSSI for each resource block, a resource in which a possibility that the terminal devices in the vicinity of the own device simultaneously perform transmission is low. Consequently, even when the terminal device performs half-duplex communication, it is possible to enhance the possibility of receiving a packet transmitted from the terminal device within a predetermined range. In other words, it is possible to improve the reception rate of data.

Furthermore, in the second embodiment described above, a description has been given with the assumption that the candidate having the smallest overall reception intensity is decided to be a final use resource; however, the candidate associated with the smallest overall reception intensity does not always need to be used as the use resource. Namely, for example, use resources may also be randomly selected from the candidates up to a predetermined number of candidates starting from the candidate having a small overall reception intensity. By doing so, it is possible to reduce a possibility that a plurality of terminal devices located in the vicinity selects the same use resource.

Furthermore, in each of the embodiments described above, a description has been given with the assumption that the unit of the resource in the time direction is set to be a slot and the unit of the resource in the frequency direction is set to be a subchannel; however, the time units and frequency units are not limited to these. For example, as the time units, a subframe or a frame including a plurality of slot may also be used. Furthermore, a mini slot that is a smaller unit than that of the slot may also be used.

Furthermore, in each of the embodiments, a description has been given of the case in which each of the terminal devices autonomously allocates a resource; however, the same resource selection described above in each of the embodiments may also be performed even when the base station device or a representative terminal device in the mobile communication system centrally allocates the resources. Namely, for example, the base station device may also manage location information on a plurality of terminal devices and allocate resources such that the nearby terminal devices does not simultaneously perform transmission or allocate resources such that the overall reception intensity is small in response to reports of the RSSI received from a plurality of terminal devices.

According to an aspect of an embodiment of the communication device, the wireless communication system, and the resource selecting method disclosed in the present invention, an advantage is provided in that it is possible to improve the reception rate of data.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication device comprising:
    processor circuitry configured to execute a process including:
        measuring a reception signal intensity for each time unit and frequency unit constituting a resource; and
        selecting a first resource such that the first resource that is used to transmit data by the communication device does not temporally overlap with a second resource that is used to transmit data by another communication device located in vicinity of the communication device based on the reception signal intensity measured at the measuring; and
    a transmitter that transmits the data by using the first resource selected by the processor circuitry.

2. The communication device according to claim 1, wherein
    the processor circuitry executes a process including:
        managing location information on a communication device in a range in which communication can be performed with the communication device; and
        selecting, based on the location information, the first resource which is different from the second resource in time domain.

3. The communication device according to claim 2, wherein
    the selecting includes selecting the first resource which is different from the second resource in time domain, the second resource being used to transmit the data by another communication device located within a predetermined range from the communication device.

4. The communication device according to claim 1, wherein
    the processor circuitry executes a process including:
        calculating, for each candidate resource that is a candidate for the first resource, an overall reception intensity that is in accordance with a reception signal intensity of the candidate resource and a reception signal intensity of a resource which is the same as the candidate resource in time domain and is different from the candidate resource in frequency domain; and
        deciding that the candidate resource of which the overall reception intensity satisfies a predetermined criterion is the first resource.

5. The communication device according to claim 4, wherein
    the deciding includes deciding that the candidate resource having a smallest overall reception intensity is the first resource.

6. A wireless communication system comprising:
    a first terminal device; and
    a second terminal device that is located in vicinity of the first terminal device, wherein
    the first terminal device includes
        processor circuitry configured to execute a process including:
            measuring a reception signal intensity for each time unit and frequency unit constituting a resource; and
            selecting a first resource such that the first resource that is used to transmit data by the first terminal device does not temporally overlap with a second resource that is used to transmit data by the second terminal device based on the reception signal intensity measured at the measuring, and
        a transmitter that transmits the data by using the first resource selected by the processor circuitry.

7. A resource selection method comprising:
    measuring a reception signal intensity for each time unit and frequency unit constituting a resource;
    selecting a first resource such that the first resource that is used to transmit data by a communication device does not temporally overlap with a second resource that is used to transmit data by another communication device located in vicinity of the communication device based on the reception signal intensity measured at the measuring, using processor circuitry; and
    transmitting the data by using the selected first resource.

* * * * *